(12) United States Patent
Babin et al.

(10) Patent No.: US 8,924,447 B2
(45) Date of Patent: Dec. 30, 2014

(54) DOUBLE PRECISION APPROXIMATION OF A SINGLE PRECISION OPERATION

(75) Inventors: Dmitry N. Babin, Moscow (RU); Denis V. Parkhomenko, Moscow region (RU); Ivan L. Mazurenko, Moscow region (RU); Denis V. Parfenov, Moscow (RU); Alexander N. Filippov, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 557 days.

(21) Appl. No.: 13/280,607

(22) Filed: Oct. 25, 2011

(65) Prior Publication Data

US 2012/0271871 A1    Oct. 25, 2012

(30) Foreign Application Priority Data

Apr. 22, 2011    (RU) ................................ 2011115796

(51) Int. Cl.
  *G06F 7/00*    (2006.01)
  *G06F 7/544*    (2006.01)
(52) U.S. Cl.
  CPC .......... *G06F 7/544* (2013.01); *G06F 2207/382* (2013.01)
  USPC ...................................................... 708/204
(58) Field of Classification Search
  None
  See application file for complete search history.

(56) References Cited

U.S. PATENT DOCUMENTS

| | | | |
|---|---|---|---|
| 5,678,016 A | 10/1997 | Eisen et al. | 395/392 |
| 6,446,104 B1* | 9/2002 | Tzeng et al. | 708/503 |
| 7,318,014 B1 | 1/2008 | Molson et al. | 703/13 |
| 7,461,116 B2 | 12/2008 | Allen | 708/495 |
| 2003/0065698 A1* | 4/2003 | Ford | 708/495 |
| 2005/0065990 A1* | 3/2005 | Allen | 708/495 |

OTHER PUBLICATIONS

Pineiro, Jose-Alejandro, et al., "High-Speed Double-Precision Computation of Reciprocal, Division, Square Root, and Inverse Squar Root", IEEE Transactions on Computers, vol. 51, No. 12, Dec. 2002, pp. 1377-1388. Wong, W.F., et al., "Fast Hardware-Based Algorithms for Elementary Function Computations Using Rectangular Multipliers", IEEE Transactions on Computers, vol. 42, No. 3, Mar. 1994, pp. 278-294.

Ito, Masayuki, et al., "Efficient Initial Approximation and Fast Converging Methods for Division and Square Root", IEEE Computer Arithmetic, 1995, Jul. 1995, pp. 2-9. "Diab™ C/C++ Compiler for SH", User Guide 5.0 Etition 1, Wind River Systems, Inc. May 9, 2002, 10 pages.

XilinX® Logicore, "APU Floating-Point Unit v3.1", Mar. 11, 2008, pp. 1-17.

* cited by examiner

*Primary Examiner* — Michael D Yaary
(74) *Attorney, Agent, or Firm* — Christopher P. Maiorana, PC (57) ABSTRACT

A method for double precision approximation of a single precision operation is disclosed. The method may include steps (A) to (B). Step (A) may store an input value in a processor. The processor generally implements a plurality of first operations in hardware. Each first operation may receive a first variable as an argument. The first variable may be implemented in a fixed point format at a single precision. The input value may be implemented in the fixed point format at a double precision. Step (B) may generate an output value by emulating a selected one of the first operations using the input value as the argument. The emulation may utilize the selected first operation in hardware. The output value may be implemented in the fixed point format at the double precision. The emulation is generally performed by a plurality of instructions executed by the processor.

20 Claims, 4 Drawing Sheets

DOUBLE PRECISION APPROXIMATION OF A SINGLE PRECISION OPERATION

This application claims the benefit of Russian Application No. 2011115796, filed Apr. 22, 2011 and is hereby incorporated by reference in its entirety.

FIELD OF THE INVENTION

The present invention relates to calculating mathematical operations generally and, more particularly, to a method and/or apparatus for implementing a double precision approximation of a single precision operation.

BACKGROUND OF THE INVENTION

Processors commonly have a set of basic operations that can be performed in hardware without resorting to software implementations. Such basic operations can be performed in a minimum number of processor cycles and so are efficient from a computational point of view. The fewer the number of basic operations that a processor implements, the lower the cost of the processor. Therefore, processor manufacturers often try to minimize the number of basic operations.

A minimal set of basic operations is often insufficient for real applications. Programmers are commonly forced to implement non-basic operations and higher-resolution basic operations in software. For example, many applications involve a calculation of a 32-bit integer result for a 1/X operation, where X is a 32-bit integer argument. If the processor executing the application only supports a 16-bit hardware calculation of the 1/X operation, where X is a 16-bit integer argument, the application will rely on a software routine to calculate the 32-bit integer result.

Known techniques to calculate 32-bit integer operations in software commonly use floating-point number calculations. The 32-bit integer values are converted to floating-point numbers. The calculations are performed with floating-point operations. A floating-point value that results from the floating-point operations is subsequently converted back into a 32-bit integer value. Hence, applying such techniques to fixed-point operations causes some technical issues. Most of the floating-point techniques use a polynomial approximation for the calculation, which is slow compared with the basic operations. Moreover, the floating-point techniques are applicable only to a narrow class of functions.

SUMMARY OF THE INVENTION

The present invention generally concerns a method for double precision approximation of a single precision operation. The method may include steps (A) to (B). Step (A) may store an input value in a processor. The processor generally implements a plurality of first operations in hardware. Each first operation may receive a first variable as an argument. The first variable may be implemented in a fixed point format at a single precision. The input value may be implemented in the fixed point format at a double precision. Step (B) may generate an output value by emulating a selected one of the first operations using the input value as the argument. The emulation may utilize the selected first operation in hardware. The output value may be implemented in the fixed point format at the double precision. The emulation is generally performed by a plurality of instructions executed by the processor.

The objects, features and advantages of the present invention include providing a method and/or apparatus for implementing a double precision approximation of a single precision operation that may (i) provide a technique to build an efficient software implementation of an arbitrary mathematical operation with double precision, (ii) utilize a single precision hardware implementation of the mathematical operation in calculating the double precision result, (iii) emulate with software a 2N-bit function F(X'), where X' is a 2N-bit fixed point number, using a hardware implementation of an N-bit function F(X), where X is an N-bit fixed point number, (iv) consume less power in calculating a double precision fixed point result of a mathematical operation compared with a floating point-based calculation of the double precision fixed point result, (v) calculate a double precision fixed point result faster than a floating point-based calculation of the double precision fixed point result, (vi) generate the double precision result with a non-iterative set of calculations and/or (vii) use the single precision fixed point hardware in the emulation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

When designing high-performance applications for use on a target processor, designs of the application may involve one or more double precision operations. If the target processor only has single precision implementations of the operations, a designer may emulate the operations using instructions (e.g., software, firmware, microcode, etc.) executed by the target processor. For example, the target processor may implement an inverse operation (e.g., Y=1/X), where X is a 16-bit fixed point (or integer) number. However, an application may specify that X is a 32-bit fixed point (or integer) number. Therefore, the software is generally utilized to emulate (or approximate) a 32-bit version of the operation.

Some embodiments of the present invention generally concern improving an accuracy of the software emulations (computations) where hardware implementations of single precision analogous operations may be available in the processor. For a processor having an N-bit precision mathematical operation (or function) Y=F(X), a software implementation of a 2N-bit precision mathematical operation Y=F(X) may be built with a low computational complexity. A mathematical operation is generally a relation that associates members of a set with members of another set.

To help keep the computational complexity of the mathematical operation low, the processor should implement a set of elementary operations. An elementary operation may be an operation involving at least one of the operations of addition, subtraction, multiplication and division. The elementary operations of addition and subtraction may be implemented for double precision values. The elementary multiplication operation of two N-bit numbers (e.g., A and B) generally produces a 2N-bit number for the product. The elementary division operation of two N-bit numbers A and B generally produces an N-bit number for the quotient. The software emulations may be applicable to both vector processors and processors performing operations in a scalar way.

Several example implementations of software implementations for double precision operations may be provided below. The examples generally include the operations 1/X, square root of X and square root of $(1-X^2)$. Other operations may be implemented to meet the criteria of a particular application. Many different operations $Y=F(X)$ may be calculated at double precision using the software where single precision versions of the operations exists in the hardware of the processor. Each operation $Y=F(X)$ should include an inverse operation $X=G(Y)$. The inverse operations may be either (i) implemented in the processor at the single precision or (ii) expressed through processor commands with small complexity. The software technique described herein may generate a result value in a single pass through a set of calculations. An accuracy of the result value generally permits usage in real applications.

The software technique generally allows 2N-bit precision software implementations of complex functions to be built in terms of already implemented basic functions by applying superposition. An accuracy of such implementations generally depends on the basic functions and may be verified by direct testing. The technique described below was successfully tested on a 1/square root (x) operation as an example.

By way of a specific example, consider a function $Y=1/X$. Values $X_0$ and $Y_0$ may be N-bit fixed point numbers that satisfy several relationships as follows: $X_0=[X \cdot 2^{(N-1)}]$, $Y_0=[Y \cdot 2^{(N-3)}]$, $Y=1/X$, where $1/4 \leq X \leq 1$ and $1 \leq Y \leq 4$. The notation "[Z]" generally means taking an integer portion of the value Z, where Z may be a fixed point number. The above conditions are generally fulfilled for many processors operating in with fixed point numbers. Typical values for N may include, but are not limited to, 16 or 32.

Figure 1:
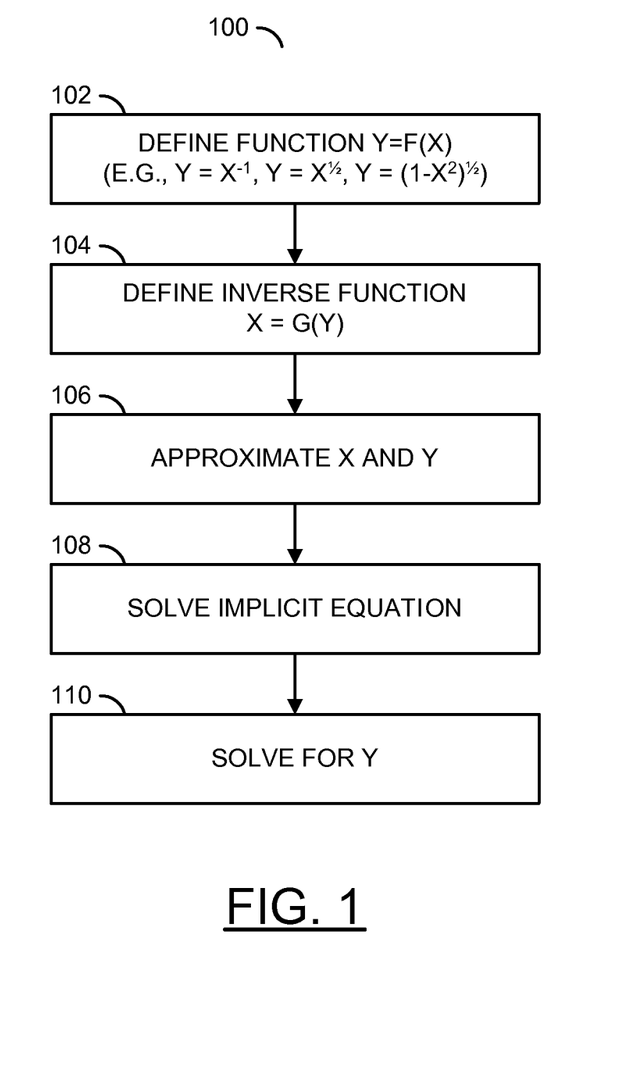
FIG. 1 is a flow diagram of a method for generating an approximation of an operation.

Referring to FIG. 1, a flow diagram of a method 100 for generating an approximation of an operation is shown. The method (or process) 100 generally comprises a step (or state) 102, a step (or state) 104, a step (or state) 106, a step (or state) 108 and a step (or state) 110. The steps 102 to 110 may represent modules and/or blocks that may be implemented as hardware, firmware, software, a combination of hardware, firmware and/or software, or other implementations.

The method 100 may be applied to a processor generally having the operations of addition, subtraction, multiplication and arithmetic shift right by a constant K (e.g., a division by $2^K$) implemented in hardware. The addition operation and the subtraction operation may be performed by the processor on 2N-bit numbers, where N is a digit capacity of the processor (e.g., N=16, 32, 64, 128, etc.). The multiplication operation may implement a double precision integer multiplication for single precision arguments. For example, the multiplication operation generally has two N-bit arguments and a 2N-bit result. The division operation may be implemented as an N-bit precision division of two N-bit arguments.

In the step 102, a function (or operation) $Y=F(X)$ may be defined by the designer (or programmer or engineer). An analogous function $Y_0=F(X_0)$ may be implemented in the hardware of the processor using an N-bit fixed point argument value so that $Y_0=F(X_0)$ holds for any X, Y and $Y=F(X)$ where $X_0=[X \cdot 2^N]$ and $Y_0=[Y \cdot 2^N]$. In the step 104, an inverse function $X=G(Y)$ may be defined. The function G is generally an inverse of the function F. The function G may be implemented in the hardware of the processor with an N-bit fixed point argument.

To implement the function $Y=F(X)$ with double precision (e.g., 2N bits), an operation $\Phi$ may be determined such that $(Y_0, Y_1)=\Phi(X_0, X_1)$. The operation $\Phi$ generally provides for the transfer of the values $X_0$, $X_1$ to the values $Y_0, Y_1$. The values $Y_0$, $Y_1$, $X_0$ and $X_1$ may be defined as follows: $X_0=[X \cdot 2^N]$, $Y_0=[Y \cdot 2^N]$, $X_1=[X \cdot 2^{(2N)}-2^N \cdot X_0]$ and $Y_1=[Y \cdot 2^{(2N)}-2^N \cdot Y_0]$.

In the step 106, approximations for the values X and Y may be determined. The value of X may be approximated as $X=(X_0 \cdot 2^N + X_1)/2^{(2N)}$. The value of Y may be approximated as $Y=(Y_0 \cdot 2N + Y_1)/2^{(2N)}$. The implicit equation $X=G(X)$ may be solved by the designer for $Y_1$ in the step 108 in terms of X, $X_0$, $X_1$ and $Y_0$. The solution may be achieved by performing arithmetic operations that are inverse to the operations involved in G. Where possible, nonlinear conditions in the Y members may not be taken into account if the nonlinear conditions poorly influence calculation accuracy. Once the value of $Y_1$ has been determined, the operation $Y=F(X)$ may be expressed in step 110 as $Y=(Y_0 \cdot 2^N+Y_1)/2^{(2N)}$. An accuracy of the technique for calculating the $(Y_0, Y_1)=\Phi(X_0, X_1)$ function may by performed by either complete testing or representative random testing.

The method 100 described above in general form was tested for software increasing the precision for the following function implementations: $Y=1/X$, $Y=\sqrt{X}$ and $Y=\sqrt{1-X^2}$. The software complexity and error rate generally depend on the particular function that should be implemented. As the testing showed, in many cases the error rate is sufficiently valid for solving real problems. The speed of the technique may be high compared with existing approaches.

Figure 2A:
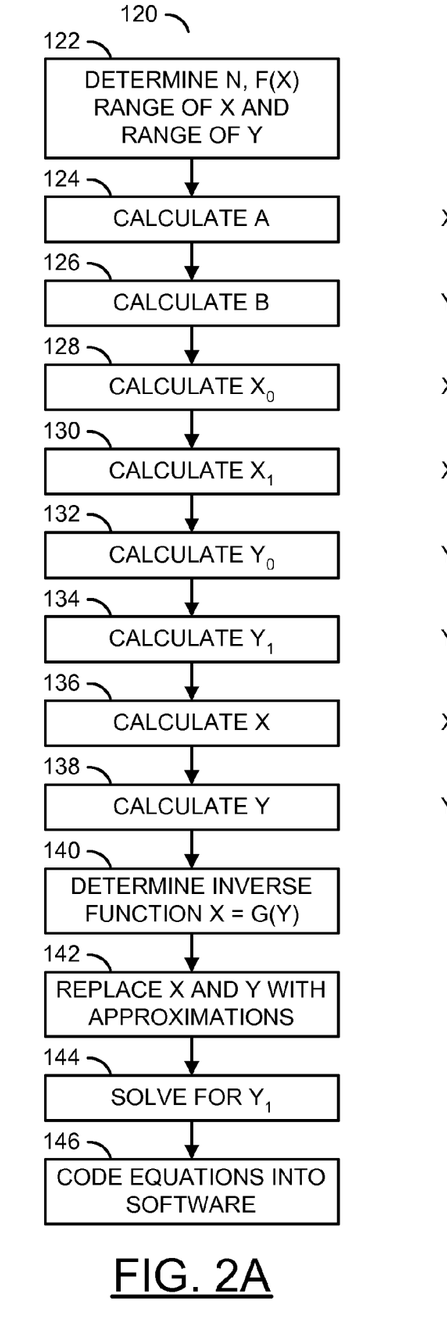
FIG. 2A is a flow diagram of an example method for generating a software approximation of an operation.
Figure 2B:
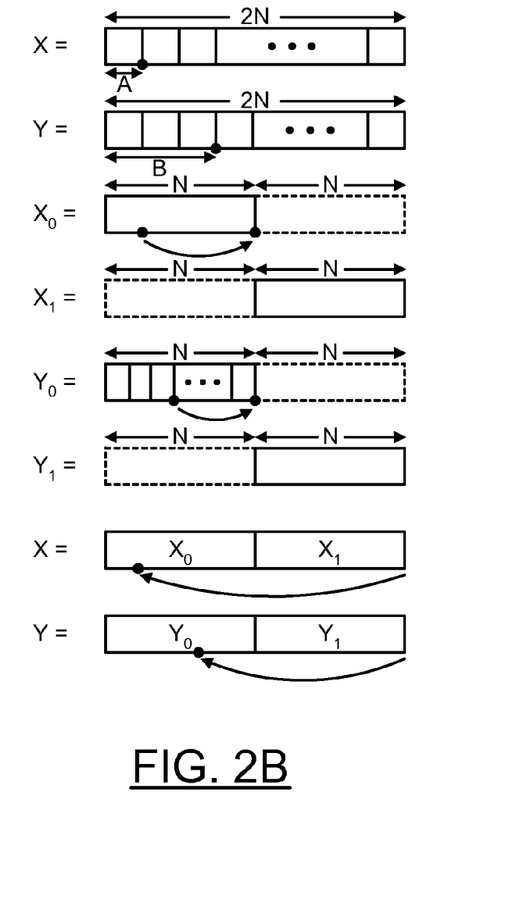
FIG. 2B is a drawing illustrating a set of fixed point values during corresponding steps in the method of FIG. 2A.

Referring to FIG. 2A, a flow diagram of an example method 120 for generating a software approximation of an operation is shown. Referring to FIG. 2B, a drawing illustrating a set of fixed point values during corresponding steps in the method 120 is shown. The method (or process) 120 generally comprises a step (or state) 122, a step (or state) 124, a step (or state) 126, a step (or state) 128, a step (or state) 130, a step (or state) 132, a step (or state) 134, a step (or state) 136, a step (or state) 138, a step (or state) 140, a step (or state) 142, a step (or state) 144 and a step (or state) 146. The steps 122 to 146 may represent modules and/or blocks that may be implemented as hardware, firmware, software, a combination of hardware, firmware and/or software, or other implementations.

In the step 122, based on the capabilities of a target processor, a value of N, an operation $F_1(X)$, a range of an argument (input) value X and a range of a result (output) value Y may be determined. Suppose that the processor has a function for calculating the inverse of the value X (e.g., $Y=F_1(X)=1/X$) implemented with N-bit (e.g., 16-bit) precision. The range of the value X may be limited to unity or less (e.g., $X \leq 1$). For $Y=1/X$, the range of the value Y may be at least 1 (e.g., $1 \leq Y$). To limit the upper value of Y, an upper boundary (e.g., 7) may be imposed on the range of Y (e.g., $1 \leq Y \leq 7$).

In the step 124, a location of a radix point in the value X may be determined based on the range of the value X. In the above example, since the value X is no greater than unity, the radix point (e.g., period) may be located at position A such that the value X may be represented by a 1-bit integer portion (e.g., A=1) and a 31-bit fractional portion (see FIG. 2B).

In the step 126, a location of a radix point may be determined based on the range of the value Y. In the above example, since the value Y is no greater than seven, the radix point may be located a position B such that the value Y may be represented by a 3-bit integer portion (e.g., B=3) and a 29-bit fractional portion (see FIG. 2B).

In the step 128, a value $X_0$ may be calculated. Generally, the value $X_0$ may be a 16-bit integer that satisfies $X=X_0/2^{15}$, $Y=1/X$ and X is a real number. As such, the value $X_0$ may be expressed as $X_0=[X \cdot 2^{(N-A)}]$ (e.g., $X_0=[X \cdot 2^{15}]$). By multiplying the value X by $2^{15}$, the radix point is effectively moved right to a middle position of the 32-bit number (see FIG. 2B). The notation "[ ]" may adjust the value $X_0$ to only the 16-bit integer portion of the product $X \cdot 2^{15}$. The value $X_0$ may be an integer representation of a most significant half (e.g., upper 16 bits) of the value X.

In the step 130, a value $X_1$ may be calculated. The value $X_1$ may be a 16-bit integer calculated as $X_1=[X \cdot 2^{(2N-A)}-2^N \cdot X_0]$ (e.g., $X_1=[X \cdot 2^{31}-2^{16} \cdot X_0]$). Multiplication of the value X by $2^{31}$ may right-shift the radix point to the right end of the 32-bit number. Multiplication of the value $X_0$ by $2^{16}$ may expand the 16-bit value to a 32-bit value, with the lower 16 bits being zeros. Subtraction of the shifted value $X_0$ from the shifted value X generally sets to zero the 16 upper bits leaving only the lower 16 bits in the result. The value $X_1$ may be an integer representation of a least significant half (e.g., lower 16 bits) of the value X.

In the step 132, a value $Y_0$ may be calculated. Generally, the value $Y_0$ may be a 16-bit integer that satisfies $Y=Y_0/2^{13}$, $Y=1/X$ and Y is a real number. As such, the value $Y_0$ may be expressed as $Y_0=[Y \cdot 2^{(N-B)}]$ (e.g., $Y_0=[Y \cdot 2^{13}]$). By multiplying the value Y by $2^{13}$, the radix point is effectively moved right to a middle position of the 32-bit number (see FIG. 2B). The notation "[ ]" may set the value $Y_0$ to only the 16-bit integer portion of the product $Y \cdot 2^{13}$. The value $Y_0$ may be an integer representation of a most significant half of the value Y.

In the step 134, a value $Y_1$ may be calculated. The value $Y_1$ may be a 16-bit integer calculated as $Y_1=[Y \cdot 2^{(2N-B)}-2^N \cdot Y_0]$ (e.g., $Y_1=[Y \cdot 2^{29}-2^{16} \cdot Y_0]$). Multiplication of the value Y by $2^{29}$ may right-shift the radix point to the right end of the 32-bit number. Multiplication of the value $Y_0$ by $2^{16}$ may expand the 16-bit value to a 32-bit value, with the lower 16 bits being zeros. Subtraction of the shifted value $Y_0$ from the shifted value Y generally sets to zero the 16 upper bits leaving only the lower 16 bits in the result. The value $Y_1$ may be an integer representation of a least significant half of the value Y.

In the step 136, an approximation of the value X may be calculated. The approximation of the value X may be the value $X_1$ appended to the end of the value $X_0$ and the radix point restored to the original position. Implementing the calculation in hardware and software may be achieved as $X=(2^N \cdot X_0 \cdot X_1)/2^{(2N-A)}$ (e.g., $X=(2^{16} \cdot X_0+X_1)/2^{31}$).

In the step 138, an approximation of the value Y may be calculated. The approximation of the value Y may be the value $Y_1$ appended to the end of the value $Y_0$ and the radix point restored to the original position. Implementing the calculation in hardware and software may be achieved as $Y=(2^N \cdot Y_0+Y_1)/2^{(2N-B)}$ (e.g., $Y=(2^{16} \cdot Y_0+Y_1)/2^{29}$).

The function $(Y_0,Y_1)=\Phi_1(X_0,X_1)$ may be built using only processor arithmetic operations and the $Y=F_1(X)$ operation. In the step 140, an inverse function $G_1$ may be determined for the function $F_1$. For the example of $F_1(X)=1/X$, the inverse may be $G_1(X)=X$. The approximations for the value X and the value Y may be inserted into the implicit equation $Y=G_1(X)$ in the step 142. The implicit equation may be expressed as follows:

$$Y=(2^{16} \cdot Y_0+Y_1)/2^{29}=G_1((2^z \cdot X_0+X_1)/2^-)=(2^{16} \cdot X_0+X_1)/2^{31}$$

The above implicit equation may be solved for the value $Y_1$ in the step 144.

At the end of the step 144, an equation may be available to calculate the values $X_0$ in terms of the value X. An equation may also be available to calculate the value $X_1$ in terms of the values X and $X_0$. The hardware function $F_1$ may be available to calculate the value $Y_0$ from the value $X_0$ (e.g., $Y_0=F_1(X_0)$). An equation may also be available to calculate the value $Y_1$ in terms of the values X, $X_0$ and $Y_0$. Furthermore, an equation may be available to calculate the approximate value Y from the values $Y_0$ and $Y_1$. Using the available equations, software (e.g., processor executable instructions) may be generated to emulate the function $F_1$ with double precision in the step 146. The software may be generated by the designer and/or by a common code generating machine that translates the equations into the software.

Everywhere above, a division by $2^N$ may be produced by applying logical shift right. For example, a value $A/2^N=A>>N$, where the notation ">>N" may represent the logical shift right by N bits.

Consider a situation where each of the above mentioned operations (e.g., multiplications, additions, 1/X and logical shifts) take place in a single processor cycle. Moreover, the domain of the functions may be restricted. Different cases generally result in different restrictions. Accordingly, a complexity for the 1/X computation may be approximately 7 processor cycles. Model testing generally shows that a maximum error in the value Y does not exceed 3 bit values, where $2^{30} \leq X \leq 2^{31}$ and $X \in [\frac{1}{2}, 1)$.

In another example implementation, a mathematical operation may be defined as $Y'=F_2(X)=\sqrt{X}$. Furthermore, the processor may include the operation $Y=F_1(X)=1/X$ in the hardware at the 16-bit precision. Therefore, the function $Y'=F_2(X)$ may be calculated, where X and Y' may be 16-bit integers that satisfy $X=X_0/2^{15}$, $Y'=Y_0'/2^{15}$, $Y'=\sqrt{X}$ and X, Y may be real numbers.

The method 120 may be by followed to build a software implementation for a square root of X operation for 32-bit numbers. As in the example for $Y=1/X$, the value N, $F_2(X)$, range of X and range of Y' may be determined in the step 122. In the steps 124 and 126, the values of A and B may be calculated (e.g., A=1 and B=1 in the example). The value $X_0$ may be determined in the step 128 as $X_0=[X \cdot 2^{15}]$. The value $X_1$ may be calculated in the step 130 as $X_1=[X \cdot 2^{31}-2^{16} \cdot X_0]$.

In the step 132, the value $Y_0'$ may be calculated as $Y_0'=[Y' \cdot 2^{15}]$. The value $Y_1'$ may be calculated in the step 134 as $Y_1'=[Y' \cdot 2^{31}-2^{16} \cdot Y_0']$. In the step 136, an approximation of the value X may be calculated as $X=(2^{16} \cdot X_0+X_1)/2^{31}$. In the step 138, an approximation of the value Y' may be calculated as $Y'=(2^{16} \cdot Y_0'+Y_1')/2^{31}$. The function $(Y_0',Y_1')=\Phi_2(X_0,X_1)$ may be built using the processor arithmetic operations and the $Y'=F_2(X)$ operation. The inverse operation G may be determined in the step 140.

The solutions of the implicit equation for the function may be calculated in steps 142 and 144 as follows: $Y'=F_2(X)$ and $Y_1'=(Z \cdot d_1)/2^{13}+(Z \cdot X_1)/2^{14}$ where $d_1=2^{15} \cdot X_0-(Y')^2$ and $Z=F_1(Y')$. In the step 146, software implementing the equations may be generated.

If a complexity of the $F_2(X)$ calculation may be considered as 1, a complexity of a 32-bit version of the $F_2(X)$ computation may be 10 processor cycles. Model testing generally shows that a maximum error in the value Y' generally does not exceed 3 bit values, where $2^{30} \leq X \leq 2^{31}$ and $X \in [\frac{1}{2}, 1)$.

In still another example implementation, a mathematical operation may be defined as $Y''=F_3(X)=\sqrt{1-X^2}$. Furthermore, the processor may implement the operations $F_3(X)$ and $F_1(X)$ in the hardware at 16-bits precision. Therefore, the function $Y''=F_3(X)$ may be calculated, where X and Y'' may be 16-bit integers that satisfy $X=X_0/2^{15}$, $Y''=Y_0''/2^{15}$, $Y''=\sqrt{1-X^2}$ and X, Y may be real numbers.

The method 120 may be by followed to build a software implementation for a square root of $(1-X^2)$ operation for 32-bit numbers. As in the earlier examples, the value N, $F_3(X)$, range of X and range of Y" may be determined in the step 122. In the steps 124 and 126, the values of A and B may be calculated (e.g., A=1 and B=1 in the example). The value $X_0$ may be determined in the step 128 as $X_0=[X \cdot 2^{15}]$. The value $X_1$ may be calculated in the step 130 as $X_1=[X \cdot 2^{31}-2^{16} \cdot X_0]$.

In the step 132, the value $Y_0$" may be calculated as $Y_0"=[Y" \cdot 2^{15}]$. The value $Y_1$" may be calculated in the step 134 as $Y_1"=[Y" \cdot 2^{31}-2^{16} \cdot Y_0"]$. In the step 136, an approximation of the value X may be calculated as $X=(2^{16} \cdot X_0+X_1)/2^{31}$. In the step 138, an approximation of the value Y" may be calculated as $Y"=(2^{16} \cdot Y_0"+Y_1")/2^{31}$. The function $(Y_0",Y_1")=\Phi_3(X_0, X_1)$ may be built using only processor arithmetic operations and the $Y"=F_3(X)$ operation. The inverse operation G may be determined in the step 140.

The solutions of the implicit equation for the function may be calculated in steps 142 and 144 as follows: $Y"=F_3(X)$ and $Y_1"=(\delta Z")/2^{13}-(X_0 X_1)/2^{20} \cdot (Z"/2^{28})$, where $Z"=F_1(Y")$ and $\delta=2^{30}-(X_0)^2-(Y")^2$. In the step 146, software implementing the equations may be generated.

If a complexity of the $F_3(X)$ operation may be considered as 1, a complexity of 32-bit version of $F_3(X)$ operation may be 14 processor cycles. Model testing generally shows that a maximum error of the value Y" does not exceed 6 bit values, where $0 \leq X \leq [(2^{31}\sqrt{3})/2]$ and $X \in [0, (\sqrt{3})/2)$.

Figure 3:
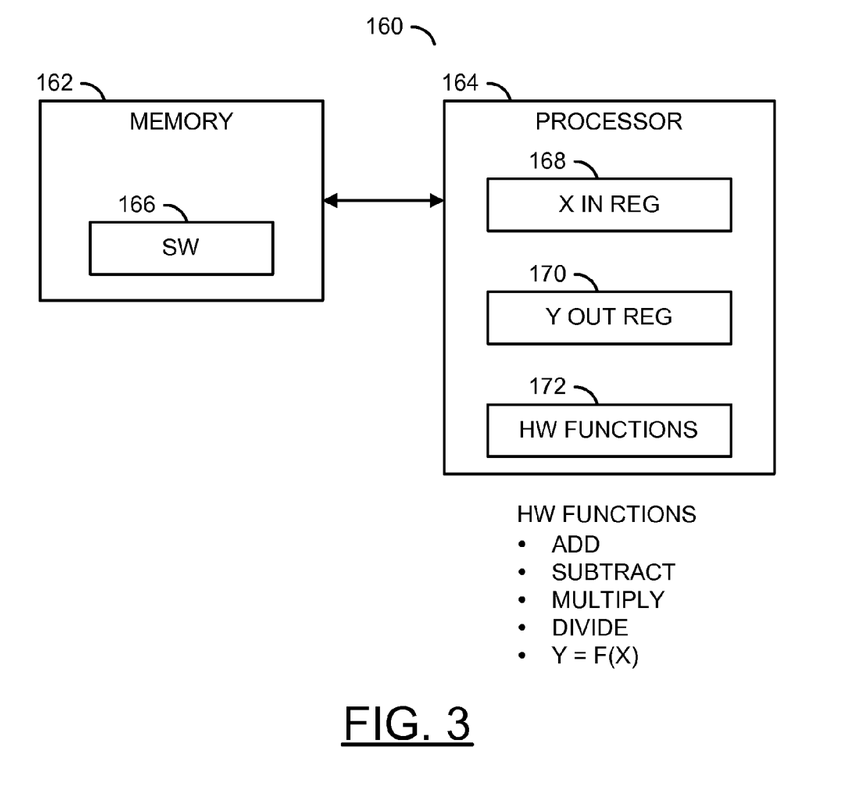
FIG. 3 is a block diagram of an apparatus in accordance with a preferred embodiment of the present invention.

Referring to FIG. 3, a block diagram of an apparatus 160 is shown in accordance with a preferred embodiment of the present invention. The apparatus (or device, circuit or integrated circuit) 160 may implement the method 120 to emulate a mathematical operation in double precision. The apparatus 160 generally comprises a block (or circuit) 162 and a block (or circuit) 164.

The circuit 162 may implement a memory circuit. The circuit 162 is generally operational to store one or more software programs (e.g., sets of instructions) 166. Each software program 166 when executed by the circuit 164 may approximate a double precision mathematical operation. The calculations performed in generating the approximation may include using a single precision version of the mathematical operation implemented in the hardware of the circuit 164.

The circuit 164 may implement a processor circuit. The circuit 164 is generally operational to perform a variety of arithmetic operations and logical operations based on the software 166 received from the circuit 162. The circuit 164 may include a register 168 configured to buffer the value X. The register 168 may be sufficiently wide to store the value X in a fixed point format at a double precision (e.g., 2N bits). The circuit 164 may also include a register 170. The register 170 may be configured to buffer the value Y, Y', Y" or similar. The register 170 may be sufficiently wide to store the values in a fixed point format at the double precision. In some embodiments, the register 168 may be an input register used to store the argument values for one or more mathematical operations calculated by the software 166 executing on the circuit 164. The register 170 may be an output register used to store the result values calculated by the mathematical operations.

The circuit 164 may also include one or more operations (or functions) implemented in the hardware alone. The operations may include the elementary operations and one or more mathematical operations. The elementary operations may include, but are not limited to, addition, subtraction, multiplication and division. Most to all of the elementary operations may by designed to operate with fixed point (or integer) numbers at double precision. The mathematical operations (e.g., Y=F(X)) may include, but are not limited to, at least one of the inverse operation, the square root operation and the square root of $(1-X^2)$ operation. All of the mathematical operations may be designed to operate with fixed point (or integer) numbers at single precision. Other operations may be implemented to meet the criteria of a particular application.

Figure 4:
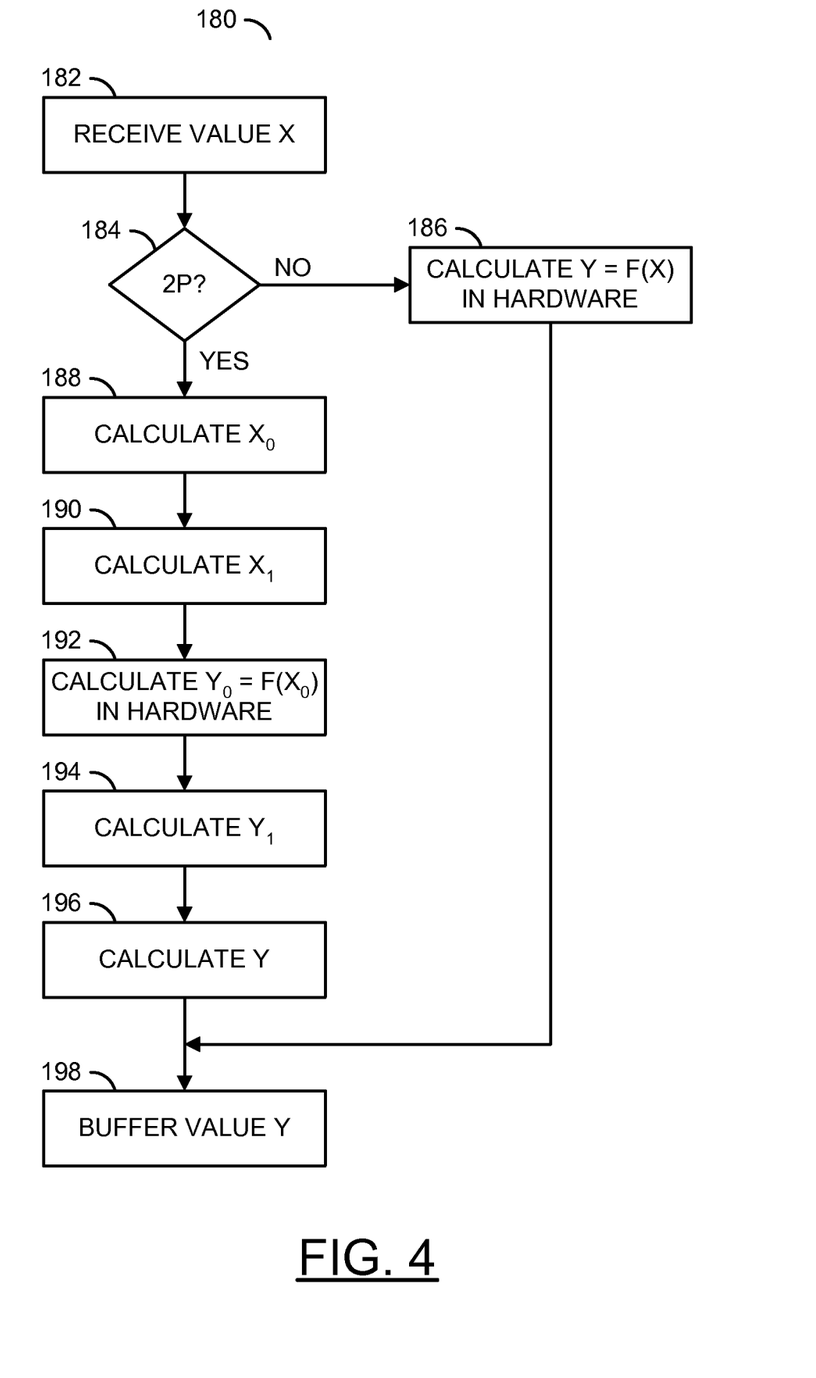
FIG. 4 is a flow diagram of an example method for an emulation of a mathematical operation.

Referring to FIG. 4, a flow diagram of an example method 180 for an emulation of a mathematical operation is shown. The method (or process) 180 may be implemented by the apparatus 160. The method 180 generally comprises a step (or block) 182, a step (or block) 184, a step (or block) 186, a step (or block) 188, a step (or block) 190, a step (or block) 192, a step (or block) 194, a step (or block) 196 and a step (or block) 198. The steps 182 to 198 may represent modules and/or blocks that may be implemented as hardware, firmware, software, a combination of hardware, firmware and/or software, or other implementations.

In the step 182, the value X representing an argument of a selected operation may be received in the register 168. The software 166 may have a previously coded determination that the selected operation is either a single precision operation or a double precision operation. If the selected operation is not a double precision operation (e.g., the NO branch of step 184), the value X may be transferred to the corresponding circuitry of the operation 172 implemented in the hardware of the circuit 164. The hardware operation 172 may calculate the result value Y in the step 186.

If the selected operation is a double precision operation (e.g., the YES branch of step 184), the software 166 may configure the circuit 164 to calculate the value $X_0$ for the selected operation in the step 188. In the step 190, the software 166 may configure the circuit 164 to calculate the value $X_1$ for the selected operation. The software 166 may further configure the circuit 164 in the step 192 to calculate the value $Y_0$ using the selected operation, as implemented in the hardware, with the value $X_0$ as the argument. In the step 194, the software 166 may configure the circuit 164 to calculate the value $Y_1$. Once the values $X_0$, $X_1$, $Y_0$ and $Y_1$ have been generated, the software 166 may further configure to the circuit 164 to calculate an approximation for the value Y in the step 196. The value Y as calculated in either the step 186 or the step 196 may be buffered in the register 170 in the step 198. Hence, a combination of the software 166 and the hardware of the circuit 164 may emulate a double precision version of the selected operation. The emulation may utilize the single precision hardware version of the selected operation in calculating the value Y. The emulation may avoid the expense of converting to and from floating point numbers.

As mentioned above, superposition may be applied in some cases to several already implemented functions to obtain double precision implementations of the single precision operation. Sometimes, solving the implicit equation is not an easy task for the designer. In order to avoid a difficult solution, the function may be expressed in terms of existing functions.

The above techniques were tested for a 32-bit precision function $1/\sqrt{X}$, which is a superposition of the 32-bit precision functions $1/X$ and $\sqrt{X}$. Complexity of the superposition approach may be approximately a sum of the complexities of each component. The function $1/\sqrt{X}$ may have approximately a 17 processor cycle complexity. Testing of the 32-bit version of the function $1/\sqrt{X}$ generally showed that not more than 7 low bits of the result may be incorrect.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1-4 represent logical data flows. The logical data flows are generally representative of physical data transferred between the respective blocks by, for example, address, data, and control signals and/or busses. The system represented by the circuit 180 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. A method for double precision approximation of a single precision operation, comprising the steps of:
   (A) storing an input value in a processor, wherein (i) said processor implements a plurality of first operations in hardware, (ii) each of said first operations receives a first variable as an argument, (iii) said first variable is implemented in a fixed point format at a single precision and (iv) said input value is implemented in said fixed point format at a double precision; and
   (B) generating an output value by an emulation of a selected one of said first operations using said input value as said argument, wherein (i) said emulation utilizes said selected first operation in said hardware at said single precision, (ii) said output value is implemented in said fixed point format at said double precision and (iii) said emulation is performed by a plurality of instructions executed by said processor.

2. The method according to claim 1, wherein said emulation comprises the step of:
   generating a first value as an integer representation of a most significant half of said input value.

3. The method according to claim 2, wherein said emulation further comprises the step of:
   generating a second value as a difference between said input value and said first value shifted to align with said most significant half.

4. The method according to claim 3, wherein said emulation further comprises the step of:
   generating a third value by performing said selected first operation in said hardware using said first value as said argument.

5. The method according to claim 4, wherein said emulation further comprises the step of:
   generating a fourth value based on said first value and said second value.

6. The method according to claim 5, wherein said output value is generated by appending said fourth value to said third value.

7. The method according to claim 1, wherein said first operations emulated by said instructions comprise at least one of (i) an inverse operation, (ii) a square root operation and (iii) a square root of a difference between unity and said argument squared.

8. The method according to claim 1, wherein said emulation utilizes a plurality of second operations implemented in said hardware at said double precision.

9. The method according to claim 8, wherein said second operations comprise (i) an addition operation, (ii) a subtraction operation and (iii) a multiplication operation.

10. An apparatus comprising:
    a processor configured to store an input value, wherein (i) said processor implements a plurality of first operations in hardware, (ii) each of said first operations receives a first variable as an argument, (iii) said first variable is implemented in a fixed point format at a single precision and (iv) said input value is implemented in said fixed point format at a double precision; and a memory containing a plurality of instructions configured to generate an output value by an emulation of a selected one of said first operations using said input value as said argument, wherein (i) said emulation utilizes said selected first operation in said hardware at said single precision, (ii) said output value is implemented in said fixed point format at said double precision and (iii) said emulation is performed by said processor executing said instructions.

11. The apparatus according to claim 10, wherein said emulation generates a first value as an integer representation of a most significant half of said input value.

12. The apparatus according to claim 11, wherein said emulation generates a second value as a difference between said input value and said first value shifted to align with said most significant half.

13. The apparatus according to claim 12, wherein said emulation generates a third value by performing said selected first operation in said hardware using said first value as said argument.

14. The apparatus according to claim 13, wherein said emulation generates a fourth value based on said first value and said second value.

15. The apparatus according to claim 14, wherein said output value is generated by appending said fourth value to said third value.

16. The apparatus according to claim 10, wherein said first operations emulated by said instructions comprise at least one of (i) an inverse operation, (ii) a square root operation and (iii) a square root of a difference between unity and said argument squared.

17. The apparatus according to claim 10, wherein said emulation utilizes a plurality of second operations implemented in said hardware at said double precision.

18. The apparatus according to claim 17, wherein said second operations comprise (i) an addition operation, (ii) a subtraction operation and (iii) a multiplication operation.

19. The apparatus according to claim 10, wherein said apparatus is implemented as one or more integrated circuits.

20. An apparatus comprising:

means for processing configured to store an input value, wherein (i) said means for processing implements a plurality of first operations in hardware, (ii) each of said first operations receives a first variable as an argument, (iii) said first variable is implemented in a fixed point format at a single precision and (iv) said input value is implemented in said fixed point format at a double precision; and means for storing a plurality of instructions configured to generate an output value by an emulation of a selected one of said first operations using said input value as said argument, wherein (i) said emulation utilizes said selected first operation in said hardware at said single precision, (ii) said output value is implemented in said fixed point format at said double precision and (iii) said emulation is performed by said means for processing executing said instructions.

* * * * *